United States Patent [19]

Wanlass et al.

[11] 4,134,052

[45] Jan. 9, 1979

[54] BI-DIRECTIONAL ELECTRIC MOTOR CONTROL CIRCUIT

[75] Inventors: Bert R. Wanlass, Warren; Anthony March, Rochester, both of Mich.

[73] Assignee: General Motors Corporation, Detroit, Mich.

[21] Appl. No.: 842,454

[22] Filed: Oct. 17, 1977

[51] Int. Cl.² .............................................. H02P 1/40
[52] U.S. Cl. ................................................... 318/282
[58] Field of Search .............. 318/282, 281, 285, 256, 318/257, 266, 267, 286

[56] References Cited

U.S. PATENT DOCUMENTS

| | | | |
|---|---|---|---|
| 2,418,351 | 4/1947 | Jackson | 318/282 |
| 3,588,652 | 6/1971 | Lewis | 318/282 |
| 3,813,590 | 5/1974 | Ellmore | 318/282 X |

*Primary Examiner*—Herman J. Hohauser
*Attorney, Agent, or Firm*—Richard G. Stahr

[57] ABSTRACT

A controlled bi-directional electric motor is energized for armature rotation in respective opposite directions in response to the operation of an electrical control switching arrangement electrically open and electrically closed. A mechanically operable electrical switching device arranged to be operated by a mechanical movable member that is driven between first and second travel limits by the controlled motor is effective, when the movable member is driven by the motor to either travel limit, to interrupt motor energization and to condition the circuit for effecting motor energization for armature rotation in the direction to drive the movable member toward the other travel limit.

5 Claims, 5 Drawing Figures

BI-DIRECTIONAL ELECTRIC MOTOR CONTROL CIRCUIT

This invention is directed to a bi-directional electric motor control circuit and, more specifically, to a control circuit of this type which is responsive to the operation of a single pole-single throw electrical control switching arrangement electrically open and electrically closed to effect controlled motor armature rotation in respective first and second opposite directions.

It is well known in the prior art that bi-directional electric motor control may be effected through an electrical bridge circuit arrangement. Typically, operating potential is applied across one of the bridge diagonals and the controlled motor is connected across the other bridge diagonal. Switching devices in opposite legs of the bridge circuit are rendered conductive simultaneously to provide motor energization for rotation in a first direction and other switching devices in the other opposite legs of the bridge circuit are rendered conductive simultaneously to effect motor energization for rotation in a second opposite direction.

It is also well known in the art that bi-directional electric motor control may be effected by a double pole-double throw switching arrangement through which the motor may be energized in respective opposite directions by operating the switch to a first position and to a second position.

The former of these prior art bi-directional control arrangements requires at least a single pole-double throw electric switch which is operated electrically closed in a first direction and in a second opposite direction to effect bi-directional motor control and the latter requires at least a double pole-double throw electric switch which is operated electrically closed in a first direction and in a second opposite direction to effect bi-directional motor control.

The present invention provides circuitry effective to energize an electric motor for armature rotation in respective opposite directions upon the operation of one single pole-single throw electrical control switching arrangement electrically open and electrically closed.

It is an object of this invention to provide an improved bi-directional electric motor control circuit.

It is another object of this invention to provide an improved bi-directional electric motor control circuit which is effective to energize the controlled motor for armature rotation in respective opposite directions upon the operation of a single pole-single throw electrical control switching arrangement electrically open and electrically closed.

It is an additional object of this invention to provide an improved bi-directional electric motor control circuit which effects bi-directional operation of the motor armature in response to the operation of a single pole-single throw electrical control switching arrangement to the electrical circuit open and electrical circuit closed conditions, respectively, and which is effective upon the driving of a movable member driven by the electric motor to either of two travel limits to interrupt motor energization and to condition the circuit for effecting motor energization for armature rotation in the opposite direction.

In accordance with this invention, a bi-directional electric motor control circuit is provided wherein bi-directional operation of the controlled motor armature is effected upon the operation of a single pole-single throw electrical control switching arrangement electrically open and electrically closed, respectively, and motor energization is interrupted and the circuit conditioned for effecting motor energization for armature rotation in the opposite direction upon a movable member driven by the controlled motor being driven to either of two travel limits.

For a better understanding of the present invention, together with additional objects, advantages and features thereof, reference is made to the following description and accompanying drawing in which:

FIG. 1 sets forth the bi-directional electric motor control circuit of this invention in schematic form;

Figure 1:
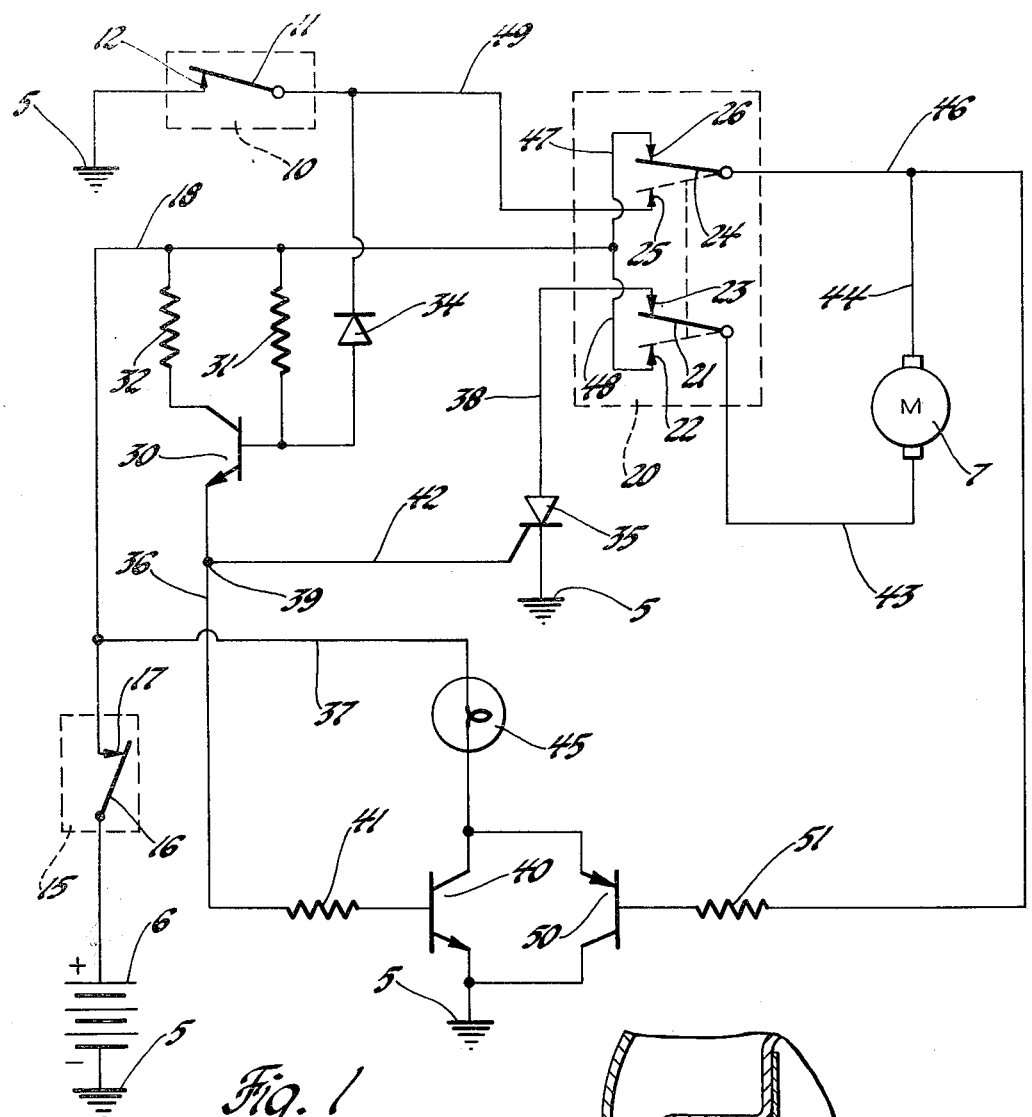

As point of reference or ground potential is the same point electrically throughout the system, it is illustrated in in FIG. 1 by the accepted schematic symbol and referenced by the numeral 5.

The bi-directional electric motor control circuit of this invention may be best employed to control a bi-directional electric motor arranged to supply the power to drive a movable member to respective first and second travel limits. In the following description of the operation of the circuit of this invention, therefore, it will be assumed that the controlled motor is arranged to mechanically drive a mechanical movable member to first and second travel limits. Later in this specification, an actual embodiment of this type will be described in detail.

Referring to FIG. 1 of the drawing, the bi-directional electric motor control circuit of this invention is set forth in schematic form in combination with a controlled direct current electric motor 7, which may be of the permanent magnet type as illustrated, and a unidirectional operating potential source which may be a conventional storage battery 6. This control circuit effects the energization of controlled motor 7 for armature rotation in a first direction and in a second opposite direction upon the operation of an electrical control switching arrangement electrically open and electrically closed, respectively. The electrical control switching arrangement is illustrated in FIG. 1 as a single pole-single throw electrical switch 10 having a movable contact 11 and a stationary contact 12, however, this may be any electrical switching arrangement capable of providing a single pole-single throw electrical switching function; that is, capable only of establishing and/or interrupting one electrical connection. If desirable, the output potential of battery 6 may be applied to and removed from the circuit of this invention by a conventional single pole-single throw electrical switch 15 having a movable contact 16 and a stationary contact 17. Upon the closure of movable contact 16 into electrical engagement with stationary contact 17, as shown in FIG. 1, battery 6 potential appears across positive polarity potential lead 18 and point of reference or ground potential 5. This switch is entirely optional and is not required in the practice of this invention.

To effect the interruption of controlled motor energization upon the controlled motor driven mechanical movable member being driven to either travel limit and to condition the circuit for effecting controlled motor energization for armature rotation in the direction to operate the movable member toward the other travel limit, a mechanically operable double pole-double throw switch 20 is provided. Double pole-double throw electrical switch 20 may be any one of the well-known commercially available lever arm actuated double pole-double throw electrical switches having the two movable contacts that are gang-operated in a manner well-known in the art. As will be explained later in this specification when a specific embodiment of the circuit of this invention is described in detail, the gang-operated movable contacts 21 and 24 of double pole-double throw electrical switch 20 are arranged to be operated to the position at which they are in electrical circuit closed engagement with respective stationary contacts 23 and 26 when a mechanical movable member driven by motor 7 is at the first travel limit and to be operated to the position at which they are in electrical circuit closed engagement with respective stationary contacts 22 and 25 when the mechanical movable member operated by motor 7 is at a second travel limit. In FIG. 1, gang-operated movable contacts 21 and 24 of double pole-double throw electrical switch 20 are indicated to be operated to the position at which they are in electrical circuit closed engagement with respective stationary contacts 23 and 26 when the mechanical movable member driven by motor 7 is at the first travel limit.

While the circuit of this invention is in the condition as indicated in FIG. 1 with electrical control switching arrangement 10 and single pole-single throw electrical switch 15 both in the electrical circuit closed condition, substantially ground potential is present upon the base electrode of NPN transistor 30 through diode 34 and closed contacts 11 and 12 of control switching arrangement 10. Consequently, transistor 30 is not conductive. While transistor 30 is not conductive, there is no gate signal applied to the gate electrode of silicon controlled rectifier 35, consequently, this device is also not conductive. While silicon controlled rectifier 35 is in the not conductive mode, motor 7 is deenergized as there is no return circuit to the negative polarity output terminal of battery 6.

Upon the operation of movable contact 11 of electrical control switching arrangement 10 electrically open, the substantially ground potential is removed from the base electrode of NPN transistor 30 and base-emitter drive current is supplied thereto from the positive polarity output terminal of battery 6 through closed contacts 16 and 17 of switch 15, positive polarity potential lead 18, base resistor 31, the base-emitter electrodes of NPN transistor 30, lead 36, input resistor 41, the base-emitter electrodes of NPN transistor 40 and point of reference or ground potential 5 to the negative polarity output terminal of battery 6. As the collector electrode of NPN transistor 30 is connected to the positive polarity output terminal of battery 6 through collector resistor 32, positive polarity potential lead 18 and closed contacts 17 and 16 of switch 15 and the emitter electrode thereof is connected to the negative polarity output terminal of battery 6 through lead 36, resistor 41, the base-emitter electrodes of NPN transistor 40 and point of reference or ground potential 5, the base-emitter drive current supplied to NPN transistor 30 triggers this device conductive through the collector-emitter electrodes thereof. Upon the collector-emitter conduction of NPN transistor 30, base-emitter drive current is supplied to NPN transistor 40 and an electrical signal of a positive polarity with respect to point of reference or ground potential 5 appears upon junction 39. As the collector electrode of NPN transistor 40 is connected to the positive polarity output terminal of battery 6 through electric indicator lamp 45, lead 37 and the closed contacts 17 and 16 of switch 15 and the emitter electrode thereof is connected to the negative polarity output terminal of battery 6 through point of reference or ground potential 5, the base-emitter drive current supplied to NPN transistor 40 triggers this device conductive through the collector-emitter electrodes thereof. Upon the collector-emitter conduction of NPN transistor 40, an energizing circuit is completed for indicator lamp 45 which may be traced from the positive polarity output terminal of battery 6, through closed contacts 16 and 17 of switch 15, lead 37, indicator lamp 45, the collector-emitter electrodes of NPN transistor 40 and point of reference or ground potential 5 to the negative polarity output terminal of battery 6. The significance of indicator lamp 45 will be explained later in this specification. The electrical signal upon junction 39 is applied through lead 42 to the gate electrode of silicon controlled rectifier 35. As the anode electrode of silicon controlled rectifier 35 is connected to the positive polarity output terminal of battery 6 through lead 38, the closed contacts 23 and 21 of switch 20, lead 43, motor 7, leads 44 and 46, closed contacts 24 and 26 of switch 20, lead 47, positive polarity potential lead 18 and closed contacts 17 and 16 of switch 15 and the cathode electrode of silicon controlled rectifier 35 is connected to the negative polarity output terminal of battery 6 through point of reference or ground potential 5, the signal applied to the gate electrode of silicon controlled rectifier 35 triggers this device conductive through the anode-cathode electrodes thereof. Upon the conduction of silicon controlled rectifier 35, a circuit through which motor 7 is energized for armature rotation in the direction to drive the movable member driven thereby toward a second travel limit is established. This circuit may be traced from the positive polarity output terminal of battery 6, through closed contacts 16 and 17 of switch 15, positive polarity potential lead 18, lead 47, closed contacts 26 and 24 of switch 20, leads 46 and 44, motor 7, lead 43, closed contacts 21 and 23 of switch 20, lead 38, conducting silicon controlled rectifier 35 and point of reference or ground potential 5 to the negative polarity output terminal of battery 6. Upon the completion of this energizing circuit, the armature of motor 7 rotates in a first direction to drive the movable member driven by motor 7 toward the second travel limit.

From this description, it is apparent that, in response to the operation of the electrical control switching arrangement 10 to an electrically open condition, NPN transistor 30 is triggered conductive to produce an electrical signal effective to operate silicon controlled rectifier 35 conductive through the anode-cathode electrodes thereof and that a first circuit including the electrical switch 20 and the current carrying electrodes of silicon controlled rectifier 35 is completed and is effective to energize motor 7 for armature rotation in the direction to drive the movable member driven thereby toward a second travel limit.

When the movable member driven by motor 7 has reached the second travel limit, gang-operated movable contacts 21 and 24 of double pole-double throw electrical switch 20 are operated to the position at which they are in electrical circuit closed engagement with respective stationary contacts 22 and 25, as indicated by dashed lines in FIG. 1. With gang-operated movable contacts 21 and 24 operated to this position, the previously described motor 7 energizing circuit is interrupted, the circuit is conditioned for effecting the energization of motor 7 for armature rotation in the direction to drive the movable member driven thereby toward the first travel limit and battery 6 potential is removed from the anode electrode of silicon controlled rectifier 35 to render this device not conductive.

Upon the operation of movable contact 11 of electrical control switching arrangement 10 electrically closed, substantially ground potential is placed upon the base electrode of NPN transistor 30 to render this device not conductive, to remove the gate signal from silicon controlled rectifier 35 and to interrupt the circuit through which base-emitter drive current is supplied to NPN transistor 40, and a circuit through which motor 7 is energized for armature rotation in the direction to drive the movable member driven thereby toward the first travel limit is established. This circuit may be traced from a positive polarity output terminal of battery 6, through closed contacts 16 and 17 of switch 15, positive polarity potential lead 18, lead 48, the now closed contacts 22 and 21 of switch 20, lead 43, motor 7, leads 44 and 46, the now closed contacts 24 and 25 of switch 20, lead 49, closed contacts 11 and 12 of the electrical control switching arrangement 10 and point of reference or ground potential 5 to the negative polarity output terminal of battery 6. Upon the completion of this energizing circuit, the armature of motor 7 rotates in a second opposite direction to drive the movable member driven by motor 7 toward the first travel limit.

From this description, it is apparent that, in response to the operation of the electrical control switching arrangement 10 to an electrically closed condition, a second circuit including the electrical switch 20 and electrical control switching arrangement 10 is completed and is effective to energize motor 7 for armature rotation in the direction to drive the movable member driven thereby toward the first travel limit.

When the movable member driven by motor 7 has reached the first travel limit, gang-operated movable contacts 21 and 24 of double pole-double throw electrical switch 20 are operated to the position at which they are in electrical circuit closed engagement with respective stationary contacts 23 and 26, as indicated by the solid lines of FIG. 1. With gang-operated movable contacts 21 and 24 operated to this position, the previously described motor 7 energizing circuit is interrupted and the circuit is conditioned for effecting the energization of motor 7 for armature rotation in the direction to drive the movable member driven thereby toward the second travel limit.

From the foregoing description, it is apparent that double pole-double throw electrical switch 20 is effective upon a movable member driven by motor 7 being driven to either of its travel limits to interrupt the energization of motor 7 and to condition the circuit for effecting the energization of motor 7 for armature rotation in the direction to drive the movable member driven thereby toward the other travel limit.

When the circuit through which base-emitter drive current is supplied to NPN transistor 40 is interrupted upon the operation of movable contact 11 of electrical control switching arrangement 10 into electrical circuit closed relationship with stationary contact 12, as previously described, NPN transistor 40 is rendered not conductive through the collector-emitter electrodes thereof. However, emitter-base drive current is supplied to PNP transistor 50 through a circuit which may be traced from the positive polarity output terminal of battery 6, through closed contacts 16 and 17 of switch 15, lead 37, indicator lamp 45, the emitter-base electrodes of PNP transistor 50, resistor 51, lead 46, the contacts 24 and 25 of electric switch 20 which remain closed until motor 7 has driven the movable member driven thereby to the first travel limit, lead 49, closed contacts 11 and 12 of electrical control switching arrangement 10 and point of reference or ground potential 5 to the negative polarity output terminal of battery 6. Consequently, PNP transistor 50 is triggered conductive through the emitter-collector electrodes thereof to maintain an energizing circuit for electric indicator lamp 45 which may be traced from the positive polarity output terminal of battery 6, through closed contacts 16 and 17 of switch 15, lead 37, electric indicator lamp 45, the emitter-collector electrodes of PNP transistor 50 and point of reference or ground potential 5 to the negative polarity output terminal of battery 6. When the movable member driven by motor 7 has been driven to the first travel limit and gang-operated movable contacts 21 and 24 of electric switch 20 are operated to the position in which they are in electrical circuit engagement with respective stationary contacts 23 and 26, the circuit previously described through which emitter-base drive current is supplied to PNP transistor 50 is interrupted. Consequently, PNP transistor 50 ceases conduction to interrupt the previously described electric indicator lamp 45 energizing circuit. Electric indicator lamp 45, therefore, is energized from the time electrical control switching arrangement 10 is operated electrically open until the movable member driven by motor 7 has been driven back to the first travel limit.

Figure 2:
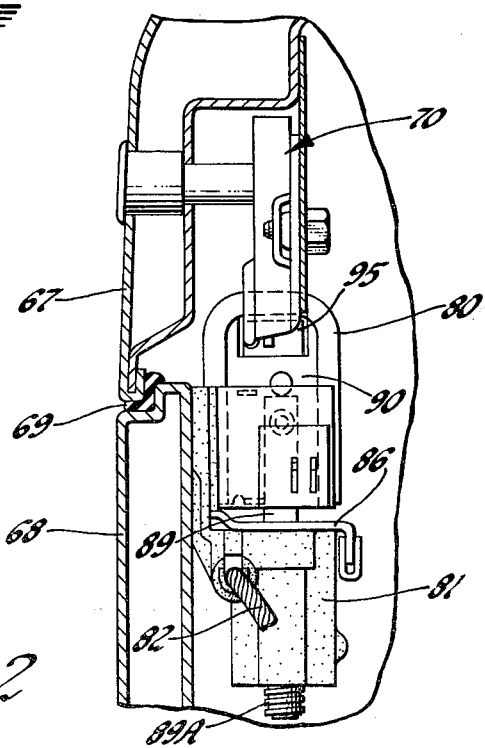
FIG. 2 is a plan view partially in cross-section of a mechanism with which the circuit of FIG. 1 may be employed.
Figure 3:
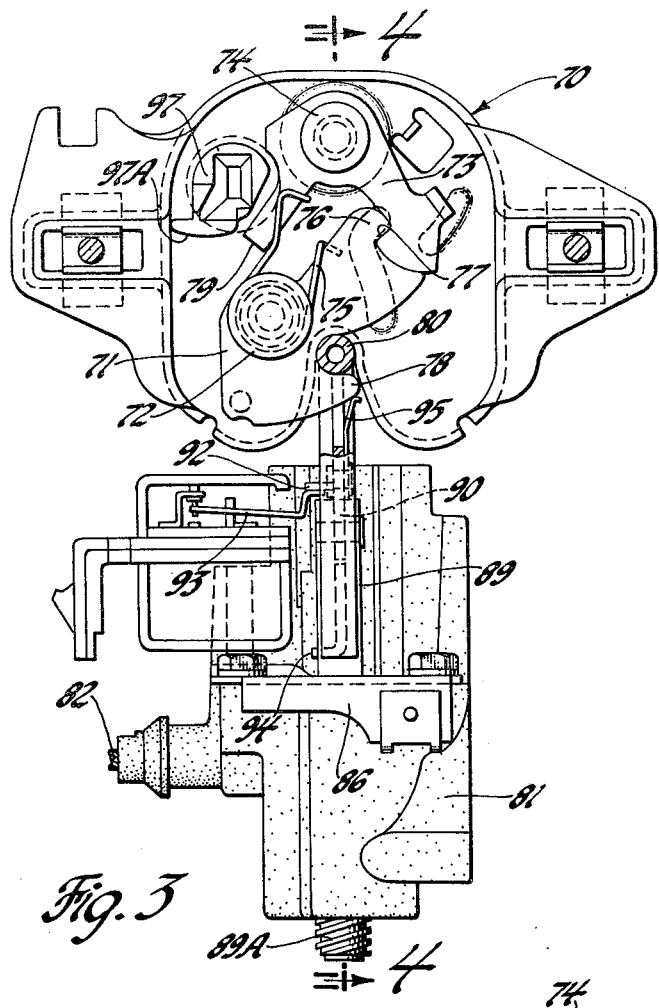
FIG. 3 is another plan view of the mechanism of FIG. 2.
Figure 5:
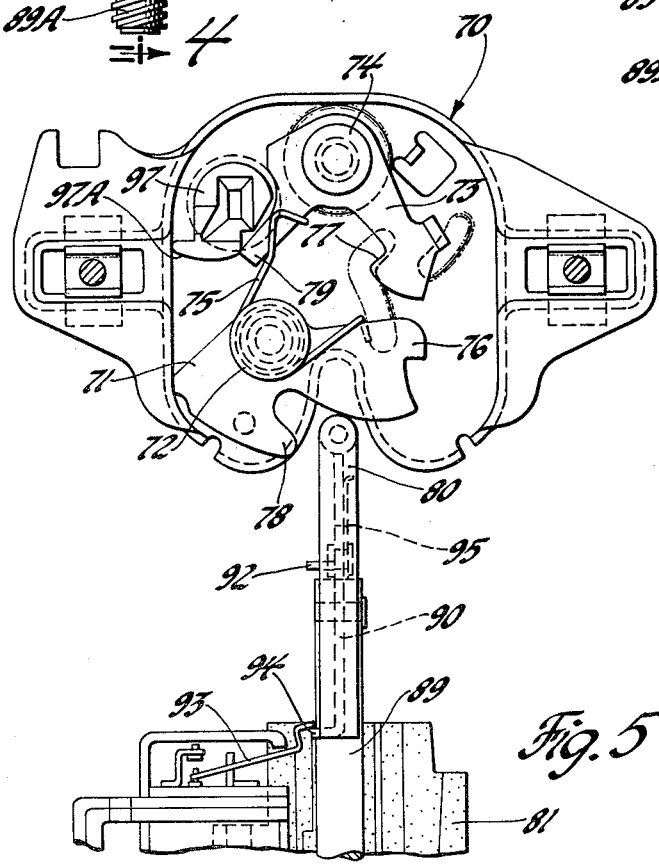
FIG. 5 is another view of a portion of the mechanism of FIG. 2.

In an actual embodiment, the circuit of FIG. 1 is employed to control a reversible direct current electric motor which operates an automobile trunk lid power pulldown mechanism. Referring to FIG. 2, a portion of each an automobile trunk lid 67 and the trunk sill 68 are shown in cross-section with the trunk lid 67 in the closed position in which it engages a rubber gasket seal 69 located between trunk lid 67 and trunk sill 68. Rigidly secured to trunk lid 67 by screws or any other suitable fastening arrangement is a trunk lid latching mechanism generally shown at 70. Referring to FIGS. 3 and 5, member 71 is arranged to pivot about pivot point 72, member 73 is arranged to pivot about pivot point 74, and both are urged to pivot in a clockwise direction, as viewing the drawing, by torsion spring 75. A pawl portion 76 of member 71 is arranged to engage the ledge or notch 77 of member 73 and a latch portion 78 of member 71 is arranged to engage in a retaining relationship the horizontal portion, as viewing the drawing, of a U-shaped striker member 80. As best seen in FIG. 3, with trunk lid 67 in the latch mode, pawl portion 76 of member 71 engages the ledge or notch 77 of member 73 and latch portion 78 of member 71 engages in a retaining relationship the horizontal portion of U-shaped striker member 80. The combination of latch portion 78 and U-shaped striker member 80, therefore, maintains trunk lid 67 in the latch mode.

In the actual embodiment, the latch portion 78 of member 71 and striker member 80 are functionally equivalent to electrical control switching arrangement 10 of FIG. 1 with striker member 80 corresponding to movable contact 11 and latch portion 78 corresponding to stationary contact 12. As the latching mechanism 70 is rigidly secured to trunk lid 67, the point of reference or ground potential 5 return circuit to the negative polarity output terminal of battery 6 is provided by the vehicle body as is well known in the automotive art. Striker member 80 is also the mechanical movable member that is mechanically driven by motor 7 to first and second travel limits as this member, in a manner to be later explained in detail, is driven by motor 7 in linear up and down directions, as viewing the drawing. In the actual embodiment, the electrical connection corresponding to lead 49 of FIG. 1 is a well known "pigtail" type electrical lead electrically connected to striker member 80 and of sufficient length to accommodate the travel distance of striker member 80.

Figure 4:
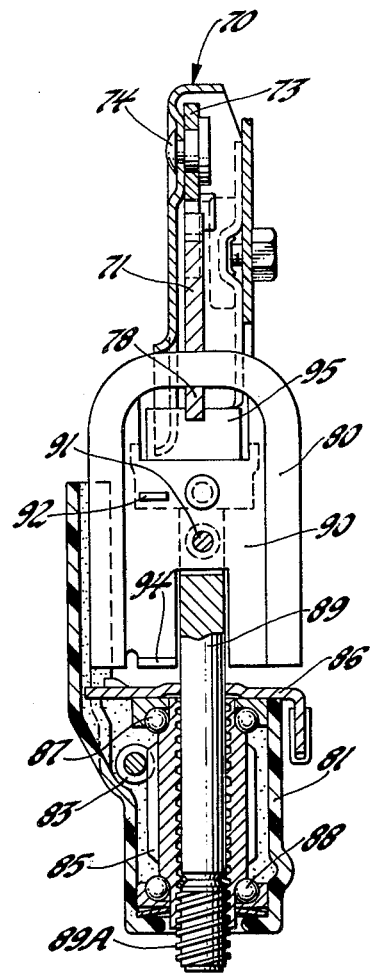
FIG. 4 is a section view of FIG. 3 taken along line 4—4 and looking in the direction of the arrows.

The mechanism, to be later explained in detail, which, when driven by motor 7, drives striker member 80 between the first and second travel limits is contained within a plastic housing member 81 which electrically insulates striker member 80 from the vehicle body. As best seen in FIG. 3, the rotatable armature of motor 7 is connected to a flexible shaft 82 which is arranged to rotate a spiral worm gear 83, best seen in FIG. 4, which is arranged to engage the teeth of a spiral gear 85. Spiral gear 85 has a threaded bore, is retained in the position as shown in FIG. 4 by cap member 86 and the bottom of housing 81 and is arranged to be rotated within housing 81 on an upper ball bearing 87 and a lower ball bearing 88. A shaft member 89 is disposed within the bore of spiral gear 85 and includes a lower threaded portion 89A, the threads of which are accommodated by the threaded bore of spiral gear 85. The end of shaft member 89 opposite the threaded end 89A is secured by a rivet 91 to a web 90 rigidly secured to striker member 80. Consequently, when motor 7 revolves worm gear 82, spiral gear 85 is rotated thereby about its vertical axis, as viewing the drawing. As spiral gear 85 is retained in position by cap 86 and the bottom of housing 81, upon the rotation of this gear through worm gear 83, shaft member 89 is driven vertically upwardly and downwardly, as viewing the drawing, depending upon the direction of rotation of motor 7. As shaft member 89 is rigidly secured to web 90 which is also rigidly secured to striker member 80, striker member 80 is driven between its two travel limits with shaft member 89 by motor 7.

In FIG. 3, latch portion 78 of member 71 of latching mechanism 70 is shown to be in retaining engagement with the horizontal portion, as viewing the drawing, of U-shaped striker member 80 which is shown to be at its first travel limit. At this travel limit, trunk lid 67 is maintained tightly closed and a pawl 92 secured to web 90 engages operating arm 93 of double pole-double throw electrical switch 20 to place movable contacts 21 and 24 in electrical circuit engagement with respective stationary contacts 23 and 26. To insure a good ground connection between latch portion 78 and striker member 80, a flexible plate 95 of a conductive material is riveted to the web 90 as best seen in FIGS. 3 and 5.

To open the trunk lid 67, the lock portion, not shown, of locking mechanism 70 is rotated by a key in a manner well known in the automotive art to rotate member 97 in a counterclockwise direction, as viewing the drawing, about its axis. Upon the counterclockwise rotation of member 97, the cam portion 97A thereof engages arm 79 of member 73 to rotate member 73 in a counterclockwise direction, as viewing the drawing, about pivot point 74. The counterclockwise rotation of member 73 moves ledge or notch 77 thereof out of engagement with pawl portion 76 of member 71. Upon the disengagement of pawl portion 76 and ledge or notch 77, the force of torsion spring 75 rotates member 71 in a clockwise direction, as viewing the drawing, about pivot point 72. The clockwise rotation of member 71 moves latch portion 78 out of engagement with striker member 80, as best seen in FIG. 5, thus unlatching trunk lid 67.

The operation of latch portion 78 out of engagement with striker member 80 is functionally equivalent to operating the electrical control switching arrangement 10 electrically open to produce an electrical gate signal upon junction 39, FIG. 1, as previously explained. In response to this electrical gate signal, the circuit of FIG. 1 operates in a manner previously described to effect the energization of motor 7 for armature rotation in the direction which will effect the driving of the shaft member 89 and striker member 80 assembly in a vertical upward direction, as viewing the drawing. When the shaft member 89 and striker member 80 assembly has traveled to the second travel limit, the highest point of vertical travel of striker member 80, another pawl 94 secured to web 90 engages operating arm 93 of double pole-double throw electrical switch 20. Upon this engagement of operating arm 93, the movable contacts 21 and 24 of double pole-double throw electrical switch 20 are gang-operated into electrical circuit engagement with respective stationary contacts 22 and 25 to deenergize motor 7 and to condition the circuit for effecting the energization of motor 7 for armature rotation in the direction to drive striker member 80 toward the first travel limit.

Upon the closure of trunk lid 67, latch portion 78 engages striker member 80 in a retaining relationship which is functionally equivalent to operating the electrical control switching arrangement 10 electrically closed. Upon this operation of latch portion 78 into retaining relationship with striker member 80, the circuit of FIG. 1 operates in a manner previously described to effect the energization of motor 7 for armature rotation in the direction which will effect the driving of the shaft member 89 and striker member 80 assembly in a vertical downward direction, as viewing the drawing, to pull the trunk lid 67 tightly closed against gasket 69. When the shaft member 89 and striker member 80 assembly has traveled to the first travel limit, the lowest point of vertical travel of striker member 80, pawl 92 engages operating arm 93 of double pole-double throw electrical switch 20. Upon this engagement of operating arm 93, the movable contacts 21 and 24 of double pole-double throw electrical switch 20 are gang-operated into electrical circuit engagement with respective stationary contacts 23 and 26 to deenergize motor 7 and to condition the circuit for effecting the energization of motor 7 for armature rotation in the direction to drive striker member 80 toward the second travel limit.

To visibly indicate that the automobile trunk lid is not tightly closed, electric indicator lamp 45, FIG. 1, may be mounted in the passenger compartment. When motor 7 is driving movable striker member 80 from the first travel limit toward the second travel limit, NPN transistors 30 and 40 are conductive through the collector-emitter electrodes thereof, as previously explained. Consequently, the previously described energizing circuit for indicator lamp 45 is completed across the positive and negative polarity output terminals of battery 6. When latch portion 78 is operated into retaining relationship with movable striker member 80, NPN transistor 30 is rendered not conductive, as previously explained, to interrupt the circuit through which base-emitter drive current is supplied to NPN transistor 40, consequently, transistor 40 is rendered not conductive. However, PNP transistor 50 is triggered conductive at this time in a manner previously explained to maintain indicator lamp 45 energized through a previously described energizing circuit. When movable striker member 80 has been driven by motor 7 to the first travel limit, the lowest point of vertical travel thereof as viewing the drawing, pawl 92 engaging operating arm 93 gang-operates movable contacts 21 and 24 of double pole-double throw electrical switch 20 into electrical circuit engagement with respective stationary contacts 23 and 26. In this condition, both energizing circuits for indicator lamp 45 are interrupted, hence indicator lamp 45 is deenergized while trunk lid 67 is tightly closed.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An electric motor control circuit for effecting the energization of a controlled bidirectional motor by an operating potential source for armature rotation alternately in opposite directions to operate an electrical motor driven movable member to first and second travel limits, said circuit comprising: electrical switching means operated by said movable member to a first operating condition when said movable member is operated to a first said travel limit and to a second operating condition when said movable member is operated to a second said travel limit, said electrical switching means being effective upon said movable member being operated to either of said travel limits to interrupt motor energization and to condition the circuit for effecting motor energization for armature rotation in the direction to operate said movable member toward the other said travel limit; an electrical switching arrangement of the type capable only of establishing or interrupting one electrical connection that is electrically closed when said movable member is at a first said travel limit; a normally not conductive semiconductor type electrical switching device having at least two current carrying electrodes; circuit means responsive to the operation of said electrical switching arrangement to an electrically open condition for producing an electrical signal effective to operate said semiconductor type electrical switching device conductive through said current carrying electrodes thereof; a first circuit including said electrical switching means and said current carrying electrodes of said semiconductor type electrical switching device that is effective to energize a controlled motor for armature rotation in the direction to operate said movable member toward a second said travel limit in response to the operation of said electrical switching arrangement to a electrically open condition; and a second circuit including said electrical switching means and said electrical switching arrangement that is effective to energize a controlled motor for armature rotation in the direction to operate said movable member toward the first said travel limit in response to the operation of said electrical switching arrangement to an electrically closed condition.

2. An electric motor control circuit for effecting the energization of a controlled bidirectional motor by an operating potential source for armature rotation alternately in opposite directions to operate an electrical motor driven movable member to first and second travel limits, said circuit comprising: electrical switching means operated by said movable member to a first operating condition when said movable member is operated to a first said travel limit and to a second operating condition when said movable member is operated to a second said travel limit, said electrical switching means being effective upon said movable member being operated to either of said travel limits to interrupt motor energization and to condition the circuit for effecting motor energization for armature rotation in the direction to operate said movable member toward the other said travel limit; an electrical switching arrangement of the type capable only of establishing or interrupting one electrical connection that is electrically closed when said movable member is at a first said travel limit; a normally not conductive silicon controlled rectifier having at least two current carrying electrodes; a transistor responsive to the operation of said electrical switching arrangement to an electrically open condition for producing an electrical signal effective to operate said silicon controlled rectifier conductive through said current carrying electrodes thereof; a first circuit including said electrical switching means and said current carrying electrodes of said silicon controlled rectifier that is effective to energize a controlled motor for armature rotation in the direction to operate said movable member toward a second said travel limit in response to the operation of said electrical switching arrangement to an electrically open condition; and a second circuit including said electrical switching means and said electrical switching arrangement that is effective to energize a controlled motor for armature rotation in the direction to operate said movable member toward the first said travel limit in response to the operation of said electrical switching arrangement to an electrically closed condition.

3. An electric motor control circuit for effecting the energization of a controlled bidirectional motor by an operating potential source for armature rotation alternately in opposite directions to operate an electrical motor driven movable member to first and second travel limits, said circuit comprising: a mechanically operable electrical switching device operated by said movable member to a first operating condition when said movable member is operated to a first said travel limit and to a second operating condition when said movable member is operated to a second said travel limit, said electrical switching device being effective upon said movable member being operated to either of said travel limits to remove operating potential from one input terminal of a controlled two input terminal motor and to apply operating potential to the other input terminal of the controlled motor; an electrical switching arrangement of the type capable only of establishing or interrupting one electrical connection that is electrically closed when said movable member is at a first said travel limit; a normally not conductive semiconductor type electrical switching device having at least two current carrying electrodes; circuit means responsive to the operation of said electrical switching arrangement to an electrically open condition for producing an electrical signal effective to operate said semiconductor type electrical switching device conductive through said current carrying electrodes thereof; a first circuit including said mechanically operable electrical switching device and said current carrying electrodes of said semiconductor type electrical switching device that is effective to energize a controlled motor for armature rotation in the direction to operate said movable member toward a second said travel limit in response to the operation of said electrical switching arrangement to an electrically open condition; and a second circuit including said mechanically operable electrical switching device and said electrical switching arrangement that is effective to energize a controlled motor for armature rotation in the direction to operate said movable member toward the first said travel limit in response to the operation of said electrical switching arrangement to an electrically closed condition.

4. An electric motor control circuit for effecting the energization of a controlled bidirectional motor by an operating potential source for armature rotation alternately in opposite directions to operate an electrical motor driven movable member to first and second travel limits, said circuit comprising: electrical switching means operated by said movable member to a first operating condition when said movable member is operated to a first said travel limit and to a second operating condition when said movable member is operated to a second said travel limit, said electrical switching means being effective upon said movable member being operated to either of said travel limits to interrupt motor energization and to condition the circuit for effecting motor energization for armature rotation in the direction to operate said movable member toward the other said travel limit; an electrical switching arrangement of the type capable only of establishing or interrupting one electrical connection that is electrically closed when said movable member is at a first said travel limit; a normally not conductive semiconductor type electrical switching device having at least two current carrying electrodes; circuit means responsive to the operation of said electrical switching arrangement to an electrically open condition for producing an electrical signal effective to operate said semiconductor type electrical switching device conductive through said current carrying electrodes thereof; a first circuit including said electrical switching means and said current carrying electrodes of said semiconductor type electrical switching device that is effective to energize a controlled motor for armature rotation in the direction to operate said movable member toward a second said travel limit in response to the operation of said electrical switching arrangement to an electrically open condition; a second circuit including said electrical switching means and said electrical switching arrangement that is effective to energize a controlled motor for armature rotation in the direction to operate said movable member toward the first said travel limit in response to the operation of said electrical switching arrangement to an electrically closed condition; an electric lamp; and circuit means effective to energize said electric lamp in response to the operation of said electrical switching arrangement to an electrically open condition and to maintain said electric lamp energized until said electrical switching means has been operated to said first operating condition.

5. An electric motor control circuit for effecting the energization of a controlled bidirectional motor by an operating potential source for armature rotation alternately in opposite directions to operate an electrical motor driven movable member to first and second travel limits, said circuit comprising; electrical switching means operated by said movable member to a first operating condition when said movable member is operated to a first said travel limit and to a second operating condition when said movable member is operated to a second said travel limit, said electrical switching means being effective upon said movable member being operated to either of said travel limits to interrupt motor energization and to condition the circuit for effecting motor energization for armature rotation in the direction to operate said movable member toward the other said travel limit; an electrical switching arrangement of the type capable only of establishing or interrupting one electrical connection that is electrically closed when said movable member is at a first said travel limit; a normally not conductive semiconductor type electrical switching device having at least two current carrying electrodes; an electric lamp; a first transistor having at least two current carrying electrodes connected in an electric circuit that is effective to energize said electric lamp; circuit means responsive to the operation of said electrical switching arrangement to an electrically open condition for producing an electrical signal effective to operate said semiconductor type electrical switching device and said first transistor conductive through the respective said current carrying electrodes thereof; a first circuit including said electrical switching means and said current carrying electrodes of said semiconductor type electrical switching device that is effective to energize a controlled motor for armature rotation in the direction to operate said movable member toward a second said travel limit in response to the operation of said electrical switching arrangement to an electrically open condition; a second circuit including said electrical switching means and said electrical switching arrangement that is effective to energize a controlled motor for armature rotation in the direction to operate said movable member toward the first said travel limit in response to the operation of said electrical switching arrangement to an electrically closed condition; and a second transistor having two current carrying electrodes connected in electrical parallel with said current carrying electrodes of said first transistor and a control electrode connected to a point of reference potential through said electrical switching means and said electrical switching arrangement while said movable member is being operated from the second to the first said travel limits.

* * * * *